US 8,716,980 B2
(12) United States Patent
Lim

(10) Patent No.: US 8,716,980 B2
(45) Date of Patent: May 6, 2014

(54) CHARGE AND DISCHARGE SYSTEM OF SECONDARY BATTERY AND METHOD OF CONTROLLING CHARGE AND DISCHARGE OF SECONDARY BATTERY

(75) Inventor: Sungbin Lim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 537 days.

(21) Appl. No.: 12/698,134

(22) Filed: Feb. 1, 2010

(65) Prior Publication Data

US 2010/0194340 A1 Aug. 5, 2010

Related U.S. Application Data

(60) Provisional application No. 61/149,964, filed on Feb. 4, 2009.

(51) Int. Cl.
*H02J 7/00* (2006.01)
*H02J 7/04* (2006.01)

(52) U.S. Cl.
USPC ........... 320/116; 320/134; 320/136; 320/155; 320/140

(58) Field of Classification Search
USPC ......... 320/116, 112, 114, 118, 127, 134, 136, 320/137, 148, 149, 155, 156
See application file for complete search history.

(56) References Cited

U.S. PATENT DOCUMENTS

| 5,592,069 | A | 1/1997 | Dias et al. | |
|---|---|---|---|---|
| 6,222,346 | B1 * | 4/2001 | Mori | 320/134 |
| 6,642,694 | B2 * | 11/2003 | Yamanaka et al. | 320/134 |
| 7,518,338 | B2 * | 4/2009 | Wang et al. | 320/125 |
| 7,567,116 | B2 * | 7/2009 | Yoshio | 327/535 |
| 7,679,324 | B2 * | 3/2010 | Xiao et al. | 320/116 |
| 7,791,317 | B2 * | 9/2010 | Suzuki | 320/139 |
| 8,125,190 | B2 * | 2/2012 | Odaohhara | 320/134 |
| 2002/0195996 | A1 * | 12/2002 | Nakatsuji | 320/127 |
| 2006/0152194 | A1 | 7/2006 | Wang et al. | |

(Continued)

FOREIGN PATENT DOCUMENTS

| CN | 101335461 A | 12/2008 |
|---|---|---|
| GB | 2 336 955 A | 11/1999 |

(Continued)

OTHER PUBLICATIONS

SIPO Office action dated May 17, 2012, for corresponding Chinese Patent application 201010112801.9, with English translation, (15 pages).

(Continued)

*Primary Examiner* — Edward Tso
*Assistant Examiner* — Alexis Boateng
(74) *Attorney, Agent, or Firm* — Christie, Parker & Hale, LLP

(57) ABSTRACT

An electronic device includes a secondary battery having at least one bare cell, the secondary battery including a charge/discharge switching module for placing the secondary battery in one of a charging state for charging the at least one bare cell or a discharging state for discharging the at least one bare cell; and an analog front end for generating an analog signal based on information of the secondary battery and for transmitting the analog signal out of the secondary battery; and a processor external to the secondary battery for receiving the analog signal from the analog front end and for controlling the charge/discharge switching module in accordance with the analog signal.

10 Claims, 2 Drawing Sheets

(56) References Cited

U.S. PATENT DOCUMENTS

| | | | |
|---|---|---|---|
| 2006/0181244 A1* | 8/2006 | Luo et al. | 320/128 |
| 2006/0238166 A1 | 10/2006 | Wanibuchi | |
| 2008/0048614 A1* | 2/2008 | Partin et al. | 320/116 |
| 2008/0238358 A1* | 10/2008 | Koide et al. | 320/106 |
| 2008/0315831 A1* | 12/2008 | Li et al. | 320/106 |
| 2009/0001935 A1 | 1/2009 | Odaohhara | |
| 2009/0058505 A1 | 3/2009 | Yoshio | |

FOREIGN PATENT DOCUMENTS

| | | |
|---|---|---|
| JP | 2006-304548 | 11/2006 |
| JP | 2008-099371 | 4/2008 |
| JP | 2008-249713 | 10/2008 |
| KR | 10-2007-0096645 | 10/2007 |
| KR | 10-2007-0105219 A | 10/2007 |
| KR | 10-0812419 | 3/2008 |

OTHER PUBLICATIONS

Extended European Search Report dated May 24, 2011 issued in EP Application No. 10152514.5, 11 pages.

Korean Office action dated Sep. 28, 2011 issued to corresponding application No. 10-2010-0009908, listing the cited reference in this IDS, 6 pages.

Japanese Office action dated Jan. 20, 2012 issued to corresponding Japanese Patent Application No. 2010-023087, listing the cited references in this IDS, 2 pages.

\* cited by examiner

CHARGE AND DISCHARGE SYSTEM OF SECONDARY BATTERY AND METHOD OF CONTROLLING CHARGE AND DISCHARGE OF SECONDARY BATTERY

CROSS-REFERENCE TO RELATED APPLICATIONS

This application claims priority to and the benefit of U.S. Provisional Patent Application No. 61/149,964, filed on Feb. 4, 2009, the entire content of which is incorporated herein by reference.

BACKGROUND

1. Field of the Invention

The present invention relates to a secondary battery, and more particularly to a charge and discharge system of a secondary battery and a method of controlling charge and discharge of a secondary battery.

2. Description of the Related Art

In recent years, due to rapid development of electronics, portable electronic devices are being more widely distributed. Rechargeable secondary batteries are widely used as power sources of many of these portable electronic devices.

A conventional rechargeable secondary battery installed in a portable electronic device, such as a portable computer, to be charged and discharged generally includes a bare cell, a charge/discharge switching module, a current detector, a temperature detector, a microprocessor unit (hereinafter referred to as an "MPU"), and an analog front end (hereinafter referred to as an "AFE"). The AFE converts analog information on the secondary battery into digital data and transmits the converted digital data to the MPU. The information on the secondary battery may include a voltage of the bare cell, charge/discharge currents, temperature of the bare cell, and similar information detected from the bare cell, the current detector, the temperature detector, and/or various other diagnostic devices. The MPU determines a status of the secondary battery based on the information transmitted from the AFE, and transmits a corresponding control signal to the AFE. The AFE controls the charge/discharge switching module in accordance with the control signal transmitted from the MPU, so that charge and discharge of the secondary battery is controlled. The MPU of the secondary battery transmits the information on the secondary battery, that is, the converted digital data, to another MPU of a portable electronic device through a system management (SM) bus. The MPU of the portable electronic device controls charging and discharging current using the information on the secondary battery transmitted from the MPU of the secondary battery.

SUMMARY OF THE INVENTION

The present invention provides a system for controlling charge and discharge of a secondary battery using a microprocessor unit (MPU) of a portable electronic device, to which a secondary battery is connected, and a charge and discharge controlling method of the secondary battery.

In accordance with an aspect of an exemplary embodiment of the present invention, there is provided an electronic device including: a secondary battery having at least one bare cell, the secondary battery including: a charge/discharge switching module for placing the secondary battery in one of a charging state for charging the at least one bare cell or a discharging state for discharging the at least one bare cell; and an analog front end for generating an analog signal based on information of the secondary battery and for transmitting the analog signal out of the secondary battery; and a processor external to the secondary battery for receiving the analog signal from the analog front end and for controlling the charge/discharge switching module in accordance with the analog signal.

In accordance with an aspect of another exemplary embodiment of the present invention, there is provided a method of controlling charging and discharging of a secondary battery, including: requesting information from the secondary battery; receiving an analog signal from the secondary battery corresponding to the requested information; determining a status of the secondary battery based on the analog signal; and transmitting a control signal to the secondary battery to control charging and discharging of the secondary battery in accordance with the status of the secondary battery.

In accordance with an aspect of yet another exemplary embodiment of the present invention, there is provided a secondary battery including: at least one bare cell; a charge/discharge switching module for charging and discharging the at least one bare cell; and an analog front end for generating an analog signal including information of the at least one bare cell and for transmitting the analog signal to an external device.

According to exemplary embodiments of the present invention, since the charge and discharge of a secondary battery are controlled by the MPU of the portable electronic device to which the second battery is connected, the secondary battery may not include an internal MPU. As such, the secondary battery in one embodiment does not include its own processor (i.e., its own MPU for processing the analog information). Therefore, a simplified secondary battery can be achieved, and manufacturing costs can be reduced.

DETAILED DESCRIPTION

Hereinafter, exemplary embodiments of the present invention will be described in detail, with reference to the accompanying drawings.

Figure 1:
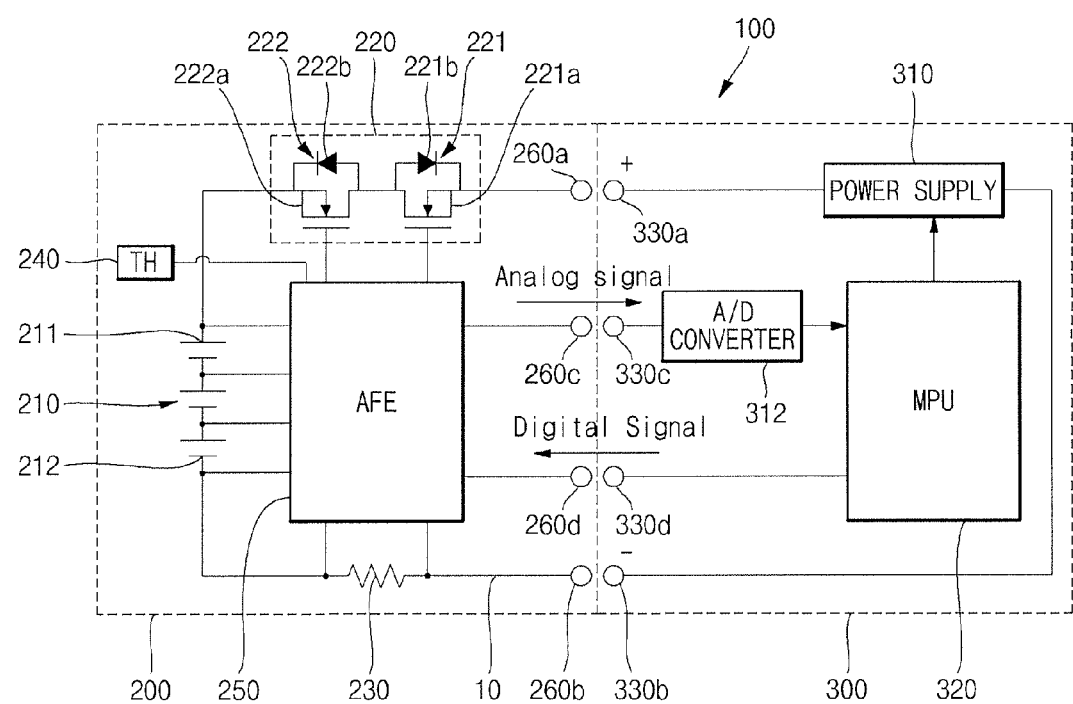
FIG. 1 is a block diagram illustrating a charge and discharge system of a secondary battery according to an embodiment of the present invention.

FIG. 1 shows a block diagram of a charge and discharge system of a secondary battery according to an embodiment of the present invention.

Referring to FIG. 1, a charge and discharge system 100 of a secondary battery includes a secondary battery 200 and a portable electronic device 300 to which the secondary battery 200 is connected.

The secondary battery 200 includes a bare cell 210, a charge/discharge switching module 220, a current detector 230, a temperature detector 240, an analog front end (AFE) 250, and a plurality of external terminals 260a, 260b, 260c, and 260d.

The bare cell 210 is a device for storing electrical energy and for supplying the electrical energy to the outside, and includes a positive electrode 211 and a negative electrode 212. The bare cell 210 may be, for example, a lithium ion battery or a lithium polymer battery. An open circuit voltage of the bare cell 210 is an analog signal, which is transmitted to the AFE 250. In FIG. 1, a number of bare cells 210 are connected to each other in series, but the present invention is not limited thereto. A number of bare cells 210 can be connected to each other in parallel, or connected in a combination of both series and parallel. In some embodiments, a single bare cell 210 may be used.

The charge/discharge switching module 220 includes a charge switching device 221 and a discharge switching device 222. The charge/discharge switching module 220 determines a direction of current in charge and discharge modes.

The charge switching device 221 includes a charge field effect transistor (hereinafter referred to as "FET") 221a and a parasitic diode 221b connected to the charge FET 221a in parallel. The charge FET 221a is mounted such that a drain and a source of the charge FET 221a are placed on a high current path 10 of the bare cell 210. In the present embodiment, the high current path 10 is a path through which charge and discharge currents of the bare cell 210 flow. The charge FET 221a is turned on and off by a control signal from the AFE 250 through a gate of the charge FET 221a. The charge FET 221a is turned on together with a discharge FET 222a of the discharge switching device 222 for charging of the secondary battery 200, and supplies the charge current from the portable electronic device 300 to the bare cell 210 through the first positive terminal 260a and the first negative terminal 260b.

The parasitic diode 221b corresponding to the charge FET 221a is connected to the charge FET 221a in a reverse biased direction relative to the charge current direction. When the charge FET 221a is turned off, the parasitic diode 221b corresponding to the charge FET 221a provides a path through which the discharge current may flow.

The discharge switching device 222 includes a discharge FET 222a and a parasitic diode 222b connected in parallel to the discharge FET 222a.

The discharge FET 222a is mounted such that a drain and a source of the discharge FET 222a are placed on the high current path 10 of the bare cell 210. The discharge FET 222a is turned on and off by a control signal from the AFE 250 through a gate of the discharge FET 222a. The discharge FET 222a is turned on together with the charge FET 221a for discharging of the secondary battery 200, and supplies the discharge current from the bare cell 210 to the portable electronic device 300 through the first positive terminal 260a and the first negative terminal 260b.

The parasitic diode 222b corresponding to the discharge FET 222a is connected to the discharge FET 222a in a reverse biased direction relative to the discharge current direction. When the discharge FET 222a is turned off, the parasitic diode 222b corresponding to the discharge FET 222a provides a path through which the charge current may flow.

The current detector 230 is installed on the high current path 10. Both ends of the current detector 230 are electrically connected to the AFE 250. In one embodiment of the present invention, a resistor (e.g., a sense resistor) is used as the current detector 230. A voltage difference between the two ends of the current detector 230 is transmitted as an analog signal to the AFE 250, and the transmitted voltage difference is used to estimate the amount of electric current flowing through the high current path 10.

The temperature detector 240 is positioned near the bare cell 210 and is electrically connected to the AFE 250. In one embodiment of the present invention, a thermistor is used as the temperature detector 240. The temperature detector 240 detects a temperature of the bare cell 210, and the detected temperature of the bare cell 210 is transmitted as an analog signal to the AFE 250.

The AFE 250 may include an application specific integrated circuit (ASIC). The AFE 250 may detect an open circuit voltage of the bare cell 210, scale an analog signal to a voltage level of the portable electronic device 300, and transmit the scaled analog signal to the portable electronic device 300 through the first information terminal 260c. Moreover, the AFE 250 may transmit the voltage difference between the two ends of the current detector 230 as an analog signal to the portable electronic device 300 through a first information terminal 260c. The AFE 250 may also transmit the detected temperature of the bare cell 210 from the temperature detector 240 as an analog signal to the portable electronic device 300 through the first information terminal 260c. The AFE 250 receives a digital control signal from the portable electronic device 300 through a first control signal terminal 260d, and controls the charge FET 221a and the discharge FET 222a of the charge/discharge switching module 220 based on the signal to activate (i.e., accommodate the flow of) either the charge current or the discharge current.

The plurality of external terminals 260a, 260b, 260c, and 260d includes the first positive terminal 260a, the first negative terminal 260b, the first information terminal 260c, and the first control signal terminal 260d. The first positive terminal 260a and the first negative terminal 260b are electrically connected to the positive electrode 211 and the negative electrode 212 of the bare cell 210, respectively, along the high current path 10. The first positive terminal 260a and the first negative terminal 260b are electrically connected to the portable electronic device 300 to accommodate the charge and discharge currents.

The first information terminal 260c is electrically connected to the AFE 250. The AFE 250 transmits information about the secondary battery 210 to the portable electronic device 300 through the first information terminal 260c, typically in the form of an analog signal. In this case, information about the secondary battery 210, which is transmitted through the first information terminal 260c to the portable electronic device 300, contains information such as the voltage of the bare cell 210, the voltage difference between the two ends of the current detector 230, and the temperature of the bare cell 210 detected by the temperature detector 240.

The first control signal terminal 260d is electrically connected to the AFE 250. A digital control signal is transmitted from the portable electronic device 300 to the AFE 250 through the first control signal terminal 260d. An existing SM bus can provide a path through which the digital control signal is transmitted from the portable electronic device 300 to the AFE 250.

The portable electronic device 300 includes a power supply 310, an A/D converter 312, an MPU 320, and a plurality of external terminals 330a, 330b, 330c, and 330d.

The power supply 310 includes a switching device controlled by the MPU 320 and an adaptor for converting external AC power into DC power to supply to the portable electronic device 300. The power supply 310 supplies the charge current to the secondary battery 200 and supplies the discharge current from the secondary battery 200 to the portable electronic device 300 as electric power. The power supply 310 can also supply external electric power directly to the portable electronic device 300.

The A/D converter 312 converts information about the secondary battery 200, transmitted from the secondary battery 200 as an analog signal, into a digital signal, and transmits the converted digital signal to the MPU 320.

The MPU 320 includes a microprocessor a passive device, an active device, and a memory, which are electrically connected to the microprocessor. The MPU 320 outputs a digital control signal requesting information about the secondary battery 200 to the AFE 250 of the secondary battery 200. The MPU 320 receives information about the secondary battery 200 in the form of a digital signal through the A/D convertor 312. The information about the secondary battery 200 contains information such as the voltage of the bare cell 210, the voltage difference between the two ends of the current detector 230, and/or the temperature of the bare cell 210 detected by the temperature detector 240. The MPU 320 determines a status of the bare cell 210, for example, whether the bare cell 210 is over-discharged, fully-discharged, fully-charged, or over-charged, based on the voltage information of the bare cell 210, and outputs a digital control signal corresponding to the determined status of the bare cell 210 to the AFE 250. The MPU 320 calculates charge and discharge currents flowing through the high current path 10 of the secondary battery 200 using the voltage difference information between the two ends of the current detector 230. When an abnormal status is detected, the MPU 320 outputs a digital control signal for stopping charge or discharge of the secondary battery 200 to the AFE 250 of the secondary battery 200. The MPU 320 checks the information on the temperature of the bare cell 210 of the secondary battery 200 and outputs a digital control signal for stopping the charge or discharge of the secondary battery 200 to the AFE 250 of the secondary battery 200 when an abnormal status is detected. The MPU 320 also outputs a signal to control the power supply 310.

The plurality of external terminals 330a, 330b, 330c, and 330d includes a second positive terminal 330a, a second negative terminal 330b, a second information terminal 330c, and a second control signal terminal 330d. The second positive terminal 330a and the second negative terminal 330b are electrically connected to the power supply 310, and are respectively connected to the first positive terminal 260a and the first negative terminal 260b of the secondary battery 200, for forming a path through which the charge and discharge currents may flow when the secondary battery 200 is installed in or connected to the portable electronic device 300.

The second information terminal 330c is electrically connected to the A/D converter 312. When the secondary battery 200 is connected to the portable electronic device 300, the second information terminal 330c is connected to the first information terminal 260c of the secondary battery 200 and is utilized for transmitting analog signals from the first terminal 260c to the A/D converter 312.

The second control signal terminal 330d is electrically connected to the MPU 320. When the secondary battery 200 is connected to the portable electronic device 300, the second control signal terminal 330d is connected to the first control signal terminal 260d of the secondary battery 200 and is utilized for transmitting digital signals from the MPU 320 to the secondary battery 200.

Hereinafter, a method of controlling charge and discharge of a secondary battery, utilizing the charge and discharge system shown in FIG. 1, according to an embodiment of the present invention will be described in detail.

Figure 2:
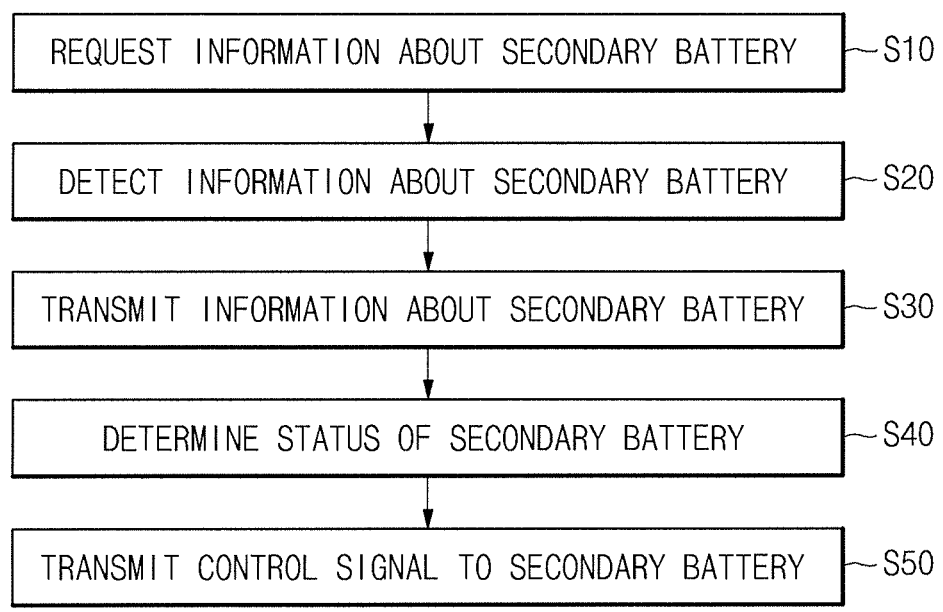
FIG. 2 is a flow chart illustrating a method of charging and discharging a secondary battery by utilizing the charge and discharge system shown in FIG. 1.

Referring to FIG. 2, the charge and discharge controlling method of the secondary battery includes requesting information about a secondary battery (S10), detecting the information about the secondary battery (S20), transmitting the information about the secondary battery (S30), determining a status of the secondary battery (S40), and transmitting a control signal to the secondary battery (S50).

Referring to the FIGS. 1 and 2, each of the above steps will be described in more detail.

In the request of information about the secondary battery (S10), the MPU 320 of the portable electronic device 300 transmits a digital control signal requesting information about the secondary battery 200 to the AFE 250 of the secondary battery 200. The digital control signal requesting information about the secondary battery 200 is transmitted through the connection between the first control signal terminal 260d of the secondary battery 200 and the second control signal terminal 330d of the portable electronic device 300.

In the detection of the information about the secondary battery (S20), the AFE 250 detects an open circuit voltage of the bare cell 210, a voltage difference between the two ends of the current detector 230, and/or a temperature of the bare cell 210 from the temperature detector 240. In one embodiment, all the detected values are analog signals.

In the transmission of the information about the secondary battery (S30), the AFE 250 transmits the voltage information of the bare cell 210, the voltage difference between the two ends of the current detector 230, and/or the temperature of the bare cell 210 detected by the temperature detector 240, to the portable electronic device 300 in the form of analog signals through the first information terminal 260c and the second information terminal 330c. In this case, the voltage signal of the bare cell 210 is scaled to the voltage level of the portable electronic device 300, and the scaled signal is transmitted. After that, the information about the secondary battery 200, in the form of the analog signal transmitted through the second information terminal 330c, is converted into a digital signal by the A/D converter 312 of the portable electronic device 300, and the converted digital signal is transmitted to the MPU 320 of the portable electronic device 300.

In the determining of the status of the secondary battery (S40), the MPU 320 of the portable electronic device 300 checks the information of the secondary battery 200 input through the A/D converter 312. The MPU 320 may determine whether the bare cell 210 is over-discharged, fully-discharged, fully-charged, or over-charged, based on the voltage information of the bare cell 210. The MPU 320 may also calculate the charge and discharge currents flowing through the high current path 10 of the secondary battery 200 using the voltage difference between the two ends of the current detector 230 of the secondary battery 200 and determine whether there is an abnormality. The MPU 320 may also check the temperature of the bare cell 210 of the secondary battery 200 and determine whether there is an abnormality.

In the transmission of the control signal to the secondary battery (S50), the MPU 320 outputs a digital control signal to the AFE 250 through the first control signal terminal 260d and the second control signal terminal 330d. The digital control signal is a signal for controlling the charge FET 221a and the discharge FET 222a of the charge and discharge switching device 220 of the secondary battery 200. The MPU 320 outputs a digital control signal, which may, for example, stop the charge or discharge of the secondary battery 200 when the voltage of the bare cell 210, the charge or discharge current, and/or the temperature of the bare cell 210 are determined to be abnormal.

Although exemplary embodiments of the present invention have been described in detail hereinabove, it should be understood that variations and modifications of the basic inventive concept herein described which may be apparent to those skilled in the art will still fall within the spirit and scope of the exemplary embodiments of the present invention, as defined by the appended claims.

What is claimed is:

1. An electronic device comprising:
   a secondary battery having at least one bare cell, the secondary battery comprising:

a charge/discharge switching module comprising a charge switching device for placing the secondary battery in a charging state for charging the at least one bare cell and a discharge switching device for placing the secondary battery in a discharging state for discharging the at least one bare cell; and an analog front end for generating an analog signal based on information of the secondary battery and for transmitting the analog signal directly out of the secondary battery; and a processor external to the secondary battery for receiving the analog signal from the analog front end and for controlling the charge/discharge switching module to control the charging and discharging of the bare cell in accordance with the analog signal;

wherein the information comprises voltage information of the at least one bare cell, and the analog signal is a signal representing the voltage information of the at least one bare cell scaled by the analog front end.

2. The electronic device of claim 1, wherein the at least one bare cell comprises a plurality of bare cells connected in series.

3. The electronic device of claim 2, wherein the voltage information comprises separate voltage information for each of the plurality of bare cells.

4. The electronic device of claim 1, wherein the secondary battery is in the charging state or in the discharging state when the charge switching device and the discharge switching device are activated.

5. The electronic device of claim 1, wherein the charge switching device and the discharge switching device each comprises a field effect transistor, wherein a parasitic diode is parallel to the field effect transistor.

6. The electronic device of claim 1, wherein the secondary battery further comprises a current detector for detecting an amount of current through the secondary battery, and wherein the information further comprises information on the amount of current.

7. The electronic device of claim 6, wherein the processor is configured to stop charging or discharging of the at least one bare cell when the amount of current is abnormal.

8. The electronic device of claim 1, wherein the secondary battery further comprises a temperature detector for detecting a temperature of the at least one bare cell, and wherein the information further comprises information on the temperature.

9. The electronic device of claim 8, wherein the processor is configured to stop charging or discharging of the at least one bare cell when the temperature is abnormal.

10. The electronic device of claim 1, further comprising a power supply for supplying power from the secondary battery when the secondary battery is in the discharging state, and for supplying power from an external power source to the secondary battery when the secondary battery is in the charging state.

* * * * *